(12) United States Patent
Shiao et al.

(10) Patent No.: US 9,670,677 B2
(45) Date of Patent: Jun. 6, 2017

(54) ROOFING GRANULE INCLUDING A BASE PARTICLE AND A LAYER COVERING THE BASE PARTICLE, A PROCESS OF FORMING THE SAME, AND A ROOFING PRODUCT INCLUDING THE ROOFING GRANULE

(71) Applicants: Ming Liang Shiao, Collegeville, PA (US); Gregory F. Jacobs, Oreland, PA (US)

(72) Inventors: Ming Liang Shiao, Collegeville, PA (US); Gregory F. Jacobs, Oreland, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 148 days.

(21) Appl. No.: 14/023,151

(22) Filed: Sep. 10, 2013

(65) Prior Publication Data

US 2014/0087137 A1 Mar. 27, 2014

Related U.S. Application Data

(60) Provisional application No. 61/701,085, filed on Sep. 14, 2012.

(51) Int. Cl.
*E04D 1/28* (2006.01)
*B05D 7/00* (2006.01)
*E04D 1/00* (2006.01)

(52) U.S. Cl.
CPC ............. *E04D 1/28* (2013.01); *B05D 7/52* (2013.01); *E04D 2001/005* (2013.01); *Y10T 428/2438* (2015.01); *Y10T 428/2991* (2015.01)

(58) Field of Classification Search
CPC ... C09D 1/00; E04D 7/005; Y10T 428/24355; Y10T 428/24364; Y10T 428/24372;
(Continued)

(56) References Cited

U.S. PATENT DOCUMENTS 2,718,479 A * 9/1955 Bierly ..................... 428/445
3,479,201 A 11/1969 Sloan
(Continued)

OTHER PUBLICATIONS

U.S. Appl. No. 14/023,148, filed Sep. 10, 2013, Inventors: Ming Liang Shoo et al.
(Continued)

*Primary Examiner* — Nathan Van Sell
(74) *Attorney, Agent, or Firm* — Abel Law Group, LLP; Alexander H Plache (57) ABSTRACT

A roofing granule can include a base particle having a base material and a layer covering the base particle of the roofing granule. The layer can has a first material and a second material that includes a metal carbonate, wherein the first and second materials include a same metal element, and the base material is different from the first material. In a process of forming the roofing granule, the layer can have pores. The process can include infiltrating a fluid into the pores of the layer while the base particle is present and adjacent to the layer, wherein the fluid includes a carbonate. The process can further include reacting the carbonate with a metal compound within the layer to form a metal carbonate within the layer. The roofing granules can be used in roofing products.

9 Claims, 2 Drawing Sheets (58) Field of Classification Search
CPC ....... Y10T 428/2438; Y10T 428/24388; Y10T 428/24405; Y10T 428/24413; Y10T 428/24421; Y10T 428/2982; Y10T 428/2991; Y10T 428/2993; Y10T 428/2995; Y10T 428/2998
USPC .................. 428/141–150, 402, 403–407
See application file for complete search history.

(56) References Cited

U.S. PATENT DOCUMENTS

| | | |
|---|---|---|
| 5,116,790 A | 5/1992 | Bruno et al. |
| 5,298,654 A | 3/1994 | DeGuire et al. |
| 7,351,462 B2 | 4/2008 | Friedman et al. |
| 7,811,630 B2 | 10/2010 | Hong et al. |
| 8,114,367 B2 | 2/2012 | Riman et al. |
| 2006/0251807 A1* | 11/2006 | Hong ................... E04D 7/005 427/212 |
| 2008/0026183 A1* | 1/2008 | Vanpoulle ............. A01N 25/12 428/143 |
| 2009/0142578 A1 | 6/2009 | Riman et al. |
| 2009/0143211 A1 | 6/2009 | Riman et al. |
| 2011/0044876 A1 | 2/2011 | Riman et al. |
| 2011/0052874 A1 | 3/2011 | Zhou et al. |
| 2011/0086201 A1 | 4/2011 | Shiao et al. |
| 2011/0104469 A1 | 5/2011 | Riman et al. |
| 2011/0129407 A1 | 6/2011 | Riman et al. |
| 2011/0158873 A1* | 6/2011 | Riman et al. ................. 423/228 |
| 2011/0182799 A1* | 7/2011 | Riman et al. ................. 423/396 |

OTHER PUBLICATIONS

Riman, et al. Hydrothermal crystallization of ceramics in Ann. Chim. Sci. Mat., 2002, 27 (6), pp. 15-36.

* cited by examiner

ROOFING GRANULE INCLUDING A BASE PARTICLE AND A LAYER COVERING THE BASE PARTICLE, A PROCESS OF FORMING THE SAME, AND A ROOFING PRODUCT INCLUDING THE ROOFING GRANULE

This application claims priority to and benefit of U.S. Provisional Patent Application No. 61/701,085, filed Sep. 14, 2012, which is incorporated herein by reference in its entirety.

FIELD OF THE DISCLOSURE

The present disclosure relates to roofing granules, roofing products, and methods of forming roofing granules, and more particularly to, roofing granules including base particles and layers covering the base particles, and roofing products including such roofing granules.

RELATED ART

Roofing granules can help to retain the integrity of the roofing products during exposure to an outdoor environment. Specifically, granules can protect and preserve the roofing product from solar ultraviolet radiation. Roofing granules serve other purposes in roofing products. Roofing granules can give roofing products their aesthetic appeal. Roofing granules can include base particles that are covered with metal silicates or colorants that provide for a variety of different colors for the roofing products. Further improvements in roofing granules and processes of forming roofing granules are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. The term "averaged" is intended to refer to an average, a median, or a geometric mean.

When referring to a particle size distribution, "D" followed by a number refers to percentile of the distribution that is less than a particular size. For example, D10 of 1 micron means that 10% of the particles have a particle size 1 micron or smaller. As used herein, average diameter is used as the basis for the particle size.

Except for atmospheric pressure, all pressures described herein are gauge pressures unless explicitly stated otherwise.

The term "rare earth," within respect to the elements of the Period Table of the Elements, is intended to mean Sc, Y, La, and the lanthanide series.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

A roofing granule can include a base particle having a base material and a first layer having a first material and a second material that includes a metal carbonate. The base material can be different from the first material, and the first and second materials can include the same metal element. When forming the roofing granule, the base particle and first layer can be formed and a fluid can infiltrate into pores of the first layer and react with the first material to form the second material. The roofing granule can be used in roofing products, such as roofing shingles.

The roofing granule may be formed by a green process, that is, one in which atmospheric $CO_2$ or another greenhouse gas can be captured to form carbonic acid or a carbonate form, and thus, the process can be used to reduce $CO_2$ in the atmosphere and form a stable metal carbonate that is not readily converted back to $CO_2$ in normal use of the roofing granule. Additional benefits can include using a less expensive or less visibly appealing material for the first layer and convert it to a compound that is more weather resistant, durable, has another desirable property, or any combination thereof.

Exemplary processes and products are illustrated in the figures and described below. The particular embodiments are merely illustrative and are not intended to limit the scope of the claims. After reading the specification, skilled artisans will appreciate that other embodiments not described herein can be used without departing from the scope of the invention.

Figure 1:
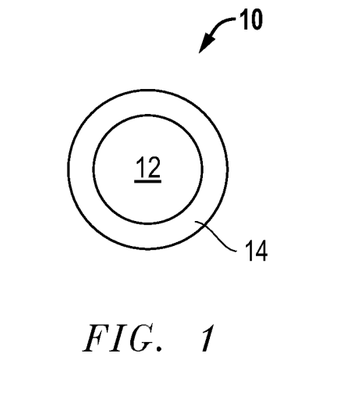
FIG. 1 includes an illustration of a cross-sectional view of a partially formed roofing granule after forming a layer that covers a base particle.

FIG. 1 includes an illustration of a cross-sectional view of a roofing granule 10 that includes a base particle 12 and a layer 14 covering the base particle 12. The base particle 12 can include suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled or manufactured materials such as crushed bricks, concrete, porcelain, fire clay, proppants and the like. Proppants can be generally spherical ceramic particles that are formed by sintering an agglomerate formed from a kaolin clay, a bauxitic clay, another suitable material, or any combination thereof. Proppants may have an averaged diameter in a range of approximately 200 microns to approximately 2.4 mm. Proppants have traditionally been used in the drilling arts. A particularly-well suited proppant is MAC 55™-brand Proppant available from Saint-Gobain NorPro of Stow Ohio. The proppants may be crushed, if needed or desired, to achieve a particular size or range of sizes for the base particles. More information regarding ceramic base particles in roofing granule applications is described in US Patent Publication Nos. 2011/0086201A1 and 2011/0052874A1, which are incorporated herein in their entireties. Thus, the illustration of the base particle 12 as being circular is merely to show a shape in accordance to a particular embodiment. Many other shapes for the base particle 12 can be used without departing from the scope of the present invention.

The layer 14 covers the base particle 12. The layer 14 can be applied using a conventional technique used for coating base particles when forming roofing granules. In an embodiment, the layer 14 can include a low density filler material or void containing filler material can be included in one or more layers to moderate the density of the roofing granule being formed. A volume occupied by the base particle 12 may be larger than a volume occupied by the layer 14. In an embodiment, a ratio of the volume of the base particle 12 to the volume of the layer 14 is at least approximately 1.1:1, at least approximately 1.5:1, at least approximately 2:1, at least approximately 3:1, at least approximately 5:1, at least approximately 9:1, at least approximately 14:1, or at least approximately 20:1.

On a comparative basis, the base particle 12 and the layer 14 are different from one another. The base particle 12 and layer 14 can have the substantially the same composition but different open porosities or different particle sizes. In another embodiment, base particle 12 and the layer 14 have different compositions. A material within the layer 14 can react with a carbonate to form a metal carbonate. The carbonate may or may not react with a material within the base particle 12. In a further embodiment, the base particle 12 and the layer 14 may have different compositions, different porosities, different particle sizes, or any combination thereof.

The layer 14 may include a matrix and corresponding pores. Exemplary materials for the layer 14 can include a metal oxide, a metal hydroxide, a metal sulfate, a metal silicate, a metal halide, another suitable metal compound, or any combination thereof. Each of the metal compounds can be a single metal element compound or a mixed-metal compound.

An exemplary metal oxide can include beryllium (for example, BeO), magnesium (for example, MgO), calcium (for example, CaO or $CaO_2$), strontium (for example, SrO), barium (for example, BaO), scandium (for example, $Sc_2O_3$), yttrium (for example, $Y_2O_3$), lanthanum (for example, $La_2O_3$), neodymium (for example, $Nd_2O_3$), any of the other lanthanide series oxides, thallium (for example, $ThO_2$, $Th_2O_3$), any of the other actinide series oxides, titanium (for example, TiO, $TiO_2$, or $Ti_2O_3$), zirconium (for example, $ZrO_2$), hafnium (for example, $HfO_2$), vanadium (for example, VO, $V_2O_3$, $VO_2$, or $V_2O_5$), niobium (for example, $NbO_2$ or $Nb_2O_5$), tantalum (for example, $TaO_2$ or $Ta_2O_5$), chromium (for example, CrO, $Cr_2O_3$, $CrO_3$, or $CrO_2$), molybdenum (for example, $MoO_2$, $Mo_2O_5$, $Mo_2O_3$ or $MoO_3$), tungsten (for example, $WO_2$ or $W_2O_5$), manganese (for example, MnO, $Mn_2O_3$, $MnO_2$, or $Mn_2O_7$), technetium (for example, $Tc_2O$ or $Tc_2O_3$), rhenium (for example, $ReO_2$ or $Re_2O_3$), iron (for example, FeO or $Fe_2O_3$), cobalt (for example, CoO, $Co_2O_3$, or $Co_3O_4$), nickel (for example, NiO or $Ni_2O_3$), ruthenium (for example, $RuO_2$ or $RuO_4$), rhodium (for example, $RhO_2$ or $Rh_2O_3$), palladium (for example, PdO or $PdO_2$), osmium (for example, OsO or $OsO_2$), iridium (for example, $IrO_2$ or $IR_2O_3$), platinum (for example, PtO, $PtO_2$, $PtO_3$, $Pt_2O_3$, or $Pt_3O_4$), copper (for example, CuO, $Cu_2O$), silver (for example, $Ag_2O$), gold (for example, $Au_2O_3$ or $Au_2O$), zinc (for example, ZnO), cadmium (for example, CdO), mercury (for example, HgO or $Hg_2O$), aluminum (for example, $Al_2O_3$), gallium (for example, $Ga_2O_3$ or $Ga_2O$), indium (for example, $In_2O_3$), germanium (for example, GeO, $GeO_2$), tin (for example, SnO, $SnO_2$), lead (for example, PbO, $PbO_2$, $Pb_3O_4$, $Pb_2O_3$, or $Pb_2O$), antimony (for example, $Sb_2O_3$ or $Sb_2O_5$), bismuth (for example, $Bi_2O_3$, $Bi_2O_5$, $Bi_2O_4$, $Bi_2O_3$, or BiO), a magnesium titanate (for example, $MgTiO_3$), a calcium titanate (for example, $CaTiO_3$), a strontium titanate (for example, $SrTiO_3$), a barium titanate (for example, $BaTiO_3$), a doped or partially substituted oxide (for example, $Ca_xSr_{(1-x)}TiO_3$ or $BaTi_yLa_{(1-y)}O_3$), another suitable metal oxide capable of forming a metal carbonate or any combination thereof.

In another embodiment, the metal hydroxide can include a magnesium hydroxide (for example, $Mg(OH)_2$), a calcium hydroxide (for example, $Ca(OH)_2$), a strontium hydroxide (for example, $Sr(OH)_2$), a barium hydroxide (for example, $Ba(OH)_2$), a titanium hydroxide (for example, $Ti(OH)_2$), a zirconium hydroxide (for example, $Zr(OH)_4$), a chromium hydroxide (for example, $Cr(OH)_2$), a manganese hydroxide (for example, $Mn(OH)_2$), an iron hydroxide (for example, $Fe(OH)_2$), a copper hydroxide (for example, $Cu(OH)_2$), a zinc hydroxide (for example, $Zn(OH)_2$), an aluminum hydroxide (for example, $Al(OH)_3$), or any combination thereof.

The metal sulfate can include $MgSO_4$, $CaSO_4$, $SrSO_4$, $BaSO_4$, a titanium sulfate (for example, $TiSO_4$ or $Ti_2(SO_4)_3$), $ZrSO_4$), a chromium sulfate (for example, $Cr_2(SO_4)_3$), a manganese sulfate (for example, $MnSO_4$), an iron sulfate (for example, $FeSO_4$), a nickel sulfate (for example, NiSO$_4$), a copper sulfate (for example, CuSO$_4$), ZnSO$_4$), Al$_2$(SO$_4$)$_3$), another suitable metal sulfate capable of forming a metal carbonate, or any combination thereof.

The metal silicate can include a lithium metasilicate, a lithium orthosilicate, a sodium metasilicate, a beryllium silicate, a calcium silicate, a strontium orthosilicate, a barium metasilicate, a zirconium silicate, a manganese metasilicate, an iron silicate, a cobalt orthosilicate, a zinc orthosilicate, a cadmium metasilicate, a mullite, a rare earth oxyorthosilicate, a rare earth pyrosilicate, andalusite, sillimanite, hyanite, kaolinite, or any combination thereof.

The metal halide can be a metal fluoride including MgF$_2$, CaF$_2$, SrF$_2$, BaF$_2$, a titanium fluoride (for example, TiF$_3$), a zirconium fluoride (for example, ZrF$_4$), a chromium fluoride (for example, CrF$_2$), a manganese fluoride (for example, MnF$_2$), an iron fluoride (for example, FeF$_2$), a copper fluoride (for example, CuF$_2$), a nickel fluoride (for example, NiF$_2$), ZnF$_2$, AlF$_3$), a mixed-metal halide (for example, La$_x$Ce$_{(1-x)}$Br$_3$ or Lu$_y$Ce$_{(1-y)}$Cl$_3$), another suitable metal halide capable of reacting to form a metal carbonate, or any combination thereof. Alternatively, the anion of the metal salts may come, for example, from the following groups: hydroxides, nitrates, chlorides, acetates, formates, propionates, phenylacetates, benzoates, hydroxybenzoates, aminobenzoates, methoxybenzoates, nitrobenzoates, sulfates, fluorides, bromides, iodides, carbonates, oxalate, phosphate, citrate, and silicates, or mixtures thereof.

Further, the layer 14 can include pigments, colorants, antimicrobials, photocatalysts or other components to modify the appearance and aesthetics of the layer 14 or its functionality. In an embodiment, the layer 14 can include an organic colorant, such as an organic pigment or an organic dye. In particular, when process conditions for reacting the layer 14 are below decomposition temperatures of organic colorants, a broader color palette is attainable for roofing granules. It will be understood that conventional inorganic colorants can also be employed. The organic colorant can be selected from the group suitable for outdoor applications, or "weatherable" organic pigments and dyes. In a particular embodiment, the organic colorant is selected from the group consisting of phthalocyanine pigments, quinacridone pigments, azo pigments and perylene pigments, or their dye analogs. In another particular embodiment, the infiltrating fluid includes a dye that is at least partially soluble in the infiltrating fluid and is carried into the layer 14 prior to reacting the layer 14.

Suitable organic pigments for use can be selected from the quinacridone pigments; phthalocyanine pigments; azo pigments such as mono azo pigments, and including azo lakes, azo chelates, and condensed azo pigments; beta-naphthol pigments; anthraquinone pigments including anthrapyrimidine pigments, flavanthrone pigments, pyranthrone pigments, and anthanthrone pigments, dioxazine pigments; quinophathalone pigments, diketopyrrolopyrrole pigments, thioindigo pigments, perylene pigments, perinone pigments, indanthrone pigments, isoindoline pigments, isoindolinone pigments, quinophathalone pigments, quinacridone pigments, quinacridone quinone pigments, and thiazineindigo pigments. In particular, preferred phthalocyanine pigments include phthalocyanine green and phthalocyanine blue. Preferred quinacridone pigments include beta-quinacridone, gamma-quinacridone, 2,9-dimethyl quinacridone, 2,9-dichloroquinacridone, and 1,8-dichloroquinacridone.

The base particle 12, the layer 14, or both may include a low density filler material or void containing filler material to moderate the density of the roofing granule. Examples of such materials can include hollow glass microspheres, hollow ceramic microspheres, polymer microspheres, expanded perlite, volcanic ash, pumice, another suitable material, or any combination thereof. Such materials may or may not participate in the carbonation reaction described herein.

A material within the base particle 12 can have an averaged particle size, and a material within the layer 14 can have a different averaged particle size. The averaged particle size of the material within the base particle 12 is no greater than approximately 95%, no greater than approximately 90%, no greater than approximately 80%, no greater than approximately 70%, no greater than approximately 50%, or no greater than approximately 20% of the averaged particle size of the material within the layer 14.

In an embodiment, the material of the layer 14 has a D10 particle size of at least approximately 0.001 microns, at least approximately 0.015 microns, at least approximately 0.11 microns, or at least approximately 1 micron, and in another embodiment, the D10 particle size is no greater than approximately 30 microns, no greater than approximately 8 microns, no greater than approximately 0.2 microns, or no greater than approximately 0.01 microns. In an embodiment, the material of the layer 14 has a D50 particle size of at least approximately 0.1 microns, at least approximately 0.8 microns, at least approximately 1.3 microns, or at least approximately 2 microns, and in another embodiment, the D50 particle size is no greater than approximately 90 microns, no greater than approximately 21 microns, no greater than approximately 7 microns, or no greater than approximately 0.7 microns. In a further embodiment, the material of the layer 14 has a D90 particle size of at least approximately 0.7 microns, at least approximately 1 micron, at least approximately 7 microns, or at least approximately 20 microns, and in another embodiment, the D90 particle size is no greater than approximately 220 microns, no greater than approximately 110 microns, no greater than approximately 30 microns, or no greater than approximately 17 microns. The material of the base particle 12 can have any of the particle size distributions as described with respect to the material of the layer 14.

In an embodiment, the base particle 12 has a smaller amount of open porosity as compared to the layer 14. In a particular embodiment, the base particle 12 has an open porosity that is no greater than approximately 95%, no greater than approximately 90%, no greater than approximately 80%, no greater than approximately 70%, no greater than approximately 50%, or no greater than approximately 20% of an open porosity of the layer 14. In another particular embodiment, the base particle 12 has an open porosity that is no greater than approximately 95%, no greater than approximately 90%, no greater than approximately 80%, no greater than approximately 70%, no greater than approximately 50%, or no greater than approximately 20% of the open porosity of the layer 14.

In another embodiment, the layer 14 has an open porosity that is at least approximately 5%, at least approximately 12%, at least approximately 17%, or at least approximately 25%, and in another embodiment, the layer 14 has an open porosity no greater than approximately 30%, no greater than approximately 23%, no greater than approximately 19%, or no greater than approximately 15%. In a further embodiment, the base particle 12 has an open porosity that is at least approximately 3%, at least approximately 7%, at least approximately 10%, or at least approximately 12%, and in another embodiment, the base particle 12 has an open porosity no greater than approximately 15%, no greater than approximately 12%, no greater than approximately 10%, or no greater than approximately 8%. In another embodiment, the layer 14 has a pore size that is at least about 0.01 microns, at least about 0.1 microns, or at least about 0.5 microns, and in another embodiment, no greater than about 100 microns, no greater than about 20 microns, or no greater than about 1 micron.

The process can continue with infiltrating a fluid into the pores of the layer 14 while the base particle 12 is present and adjacent to the layer 14. Pores within the layer 14 can allow the fluid to provide a reactant to a material within the layer 14. The reactant can be a carbonate of Na, K, Rb, Cs, Be, Mg, Ca, Sr, Ba, Sc, Y, La, Nd, Yb, or another lanthanide series element, Th or another actinide series element, Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Hg, Al, Ga, Ge, Sn, Pb, Sb, or any mixture thereof. In a further embodiment, the carbonate can be supplied as a carbonic acid.

The fluid may be a liquid or a gas. Skilled artisans may find use of a liquid, at the subsequent reaction conditions, to be particularly advantageous. In an embodiment, the liquid can include water, ammonia, an organic compound, another suitable medium for providing a reactant to the material of the layer 14, or any combination thereof. The organic compound can include an alcohol (for example, $C_xH_{(2x+1)}OH$, wherein x is 1, 2, or 3); a polyol (for example, $C_xH_{2x}(OH)_2$, wherein x is 1, 2, or 3); a heteroaromatic (for example, a furan, a thiophene, a pyrrole, or a pyridine); an amine (for example, $CH_3(CH_2)_nNH_2$, wherein n is 0, 1, or 2)); an ether, an ester, or a ketone having no more than 6 carbon atoms (for example, diethyl ether or acetone); a sulfoxide (for example, dimethylsulfoxide); an acetonitrile; another suitable organic compound; or any combination thereof. When an organic compound is used, skilled artisans may find such compounds that are relatively soluble in water to be particularly advantageous. In the organic compounds listed above, one or more H atoms may be substituted with one or more halides.

The pH of the fluid may be adjusted using an acid or a base. The acid can include an inorganic acid (for example, $H_2SO_4$, HCl, or $HNO_3$) or an organic acid (for example, citric acid, acetic acid, or oxalic acid). The pH of the fluid can be greater than 7, 8, 9, 19, 11, or 12. The base can include an inorganic base (for example, NaOH, KOH, or $NH_4OH$) or an organic base (for example, $CH_3(CH_2)_nNH_2$ or $((CH_3(CH_2)_n)_xNH_{(4-x)}OH$, wherein n is 0, 1, or 2, and x is 1, 2, 3, or 4). For the organic acids and bases, one or more H atoms may be substituted with a halide. In a further embodiment, a surfactant, a buffer, a corrosion inhibitor, or another suitable compound may be used to achieve a desired characteristic or reduce an adverse effect, or any combination thereof can be used.

Figure 2:
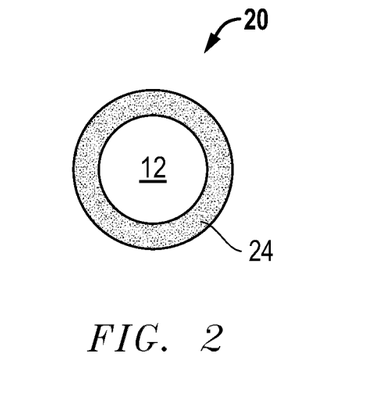
FIG. 2 includes an illustration of a cross-sectional view of the base particle and layer of FIG. 1 after reacting the layer to form a roofing granule in accordance with an embodiment.

The process can further include reacting the carbonate with a material within the layer 14 to form a carbonate compound within the reacted layer 24, as illustrated in FIG. 2. In an embodiment, the material is a metal compound, and the reaction forms a metal carbonate.

The processing conditions for the reaction may take place at a variety of pressures, temperatures and time periods. In an embodiment, the reaction is performed at a pressure of at least approximately 5 kPa, at least approximately 11 kPa, at least approximately 50 kPa, at least approximately 110 kPa, at least approximately 500 kPa, at least approximately 1.1 MPa, at least approximately 5 MPa, at least approximately 11 MPa, or at least approximately 50 MPa. In another embodiment, the reaction is performed at a pressure no greater than approximately 900 MPa, no greater than approximately 500 MPa, no greater than least approximately 90 MPa, or no greater than approximately 50 MPa, no greater than approximately 900 kPa, no greater than approximately 500 kPa, no greater than approximately 90 kPa, or no greater than approximately 50 kPa. In one embodiment, the reaction is performed at substantially ambient pressure.

In an embodiment, the reaction is performed at a temperature of at least approximately 20° C., at least approximately 50° C., at least approximately 80° C., at least approximately 110° C., at least approximately 150° C., at least approximately 200° C., at least approximately 250° C., or at least approximately 300° C. In another embodiment, the reaction is performed at a temperature no greater than approximately 1000° C., no greater than approximately 500° C., no greater than approximately 300° C., no greater than approximately 250° C., no greater than approximately 190° C., no greater than approximately 150° C., no greater than approximately 130° C., no greater than approximately 100° C., or no greater than approximately 90° C. In one embodiment, the reaction is performed at substantially ambient temperature.

In an embodiment, the reaction is performed for a time period of at least approximately 11 seconds, at least approximately 1.1 minutes, at least approximately 5 minutes, at least approximately 11 minutes, at least approximately 20 minutes, at least approximately 1 hour, at least approximately 11 hours, at least approximately 20 hours, at least approximately 50 hours. In another embodiment, the reaction is performed for a time period no greater than approximately 200 hours, no greater than approximately 90 hours, no greater than approximately 24 hours, no greater than approximately 5 hours, no greater than approximately 3 hours, no greater than approximately 2 hours, no greater than approximately 0.9 hour, or no greater than approximately 0.5 hour.

The reaction may be performed in an autoclave, a pressure pot, or another suitable apparatus capable of achieving the needed or desired processing conditions. After the reaction is completed, a roofing granule 20 in FIG. 2 is formed. The roofing granule 20 includes the base particle 12 and the reacted layer 24. In the embodiment as illustrated, substantially all of the layer 14 is reacted to form the reacted layer 24.

While many materials, infiltrating fluids, reactant compounds, and processing conditions have been described, after reading this specification, skilled artisans will be able to determine one or more particular materials, infiltrating fluids, reactant compounds, and processing conditions that are particularly well suited for an application. A metal oxide can react with an infiltrating fluid including carbonic acid to form a metal carbonate. In an illustrative example:

$$CaO + H_2CO_3 \rightarrow CaCO_3 + H_2O$$

Alternatively, the material within the layer 14 can include a Group 2 or transition metal oxide, and the infiltrating solution can include a Group 1 metal carbonate that is dissolved in water or another aqueous solution. The carbonate anion can react with the Group 2 or transition metal oxide to form a Group 2 or transition metal carbonate. The reaction may be performed in a base to help hydrolyze the Group 2 or transition metal oxide before reacting with the carbonate anions. In a particular illustrative example:

$$CaO + 2KOH \rightarrow Ca(OH)_2 + K_2O$$

$$Ca(OH)_2 + K_2CO_3 \rightarrow CaCO_3 + 2KOH$$

Thus, the overall reaction is:

$$CaO + K_2CO_3 \rightarrow CaCO_3 + K_2O$$

In a further illustrative example:

After reading this specification, skilled artisans will appreciate that many other reactions may be used. $CaCO_3$ is present in many building materials and is extensively characterized. Thus, the formation of $CaCO_3$ may be desired. In other applications, other materials may be desired, and therefore, the formation of $CaCO_3$ is not to be construed as limiting the scope of the present invention.

Analogous carbonates can also be employed using barium or magnesium salts or other divalent metal cation salts to yield, for example, barium or magnesium carbonates. Alternatively, mixtures of cation metals may be included to produce mixed metal carbonates comprising one or more of calcium, magnesium, or barium, copper, iron, manganese, nickel, silver, or zinc. In certain embodiments, the solubility of the metal carbonate in water at 20° C. is less than about 0.05, less than about 0.004, less than about 0.001, or less than about 0.0008 grams per 100 grams of water.

The reaction can change the characteristics of the reacted layer 24 as compared to the unreacted layer 14 or the base particle 12. Such characteristics can include open porosity, particle size, density, specific gravity, or change in volume occupied when forming the roofing granule.

The open porosity of the reacted layer 24 may less than the open porosity of the unreacted layer 14. In an embodiment, the open porosity of the reacted layer 24 is no greater than approximately 99%, no greater than approximately 95%, no greater than approximately 90%, no greater than approximately 80%, or no greater than approximately 70% of the open porosity of the unreacted layer 14. In another embodiment, the reacted layer 24 has an open porosity of at least approximately 2%, at least approximately 9%, at least approximately 14%, or at least approximately 18%, and in another embodiment, the reacted layer 24 has an open porosity no greater than approximately 29%, no greater than approximately 22%, no greater than approximately 18%, or no greater than approximately 15%. The open porosity of the base particle 12 may still be less than the open porosity of the reacted layer 24. In a particular embodiment, the base particle 12 has the open porosity that is at least approximately 11%, at least approximately 20%, at least approximately 30%, at least approximately 50%, or at least approximately 70% of an open porosity of the reacted layer 24.

In an embodiment, a ratio of the volume of the base particle 12 to the volume of the reacted layer 24 is at least approximately 1.1:1, at least approximately 1.5:1, at least approximately 2:1, at least approximately 3:1, at least approximately 5:1, at least approximately 9:1, at least approximately 14:1, or at least approximately 20:1. In another embodiment, the weight of the reacted layer 24 on a dry basis per weight of base particle can be approximately 2.3 kg (5 pounds) of the reacted layer 24 on 45 kg (100 pounds) of the base particles 12. In a further embodiment, the weight of the reacted layer 24 on a dry basis per weight of base particles 12 can be approximately 14 kg (30 pounds) of the reacted layer 24 on 45 kg (100 pounds) of the base particles. In still a further embodiment, any value between approximately 2.3 kg and approximately 14 kg of the reacted layer 24 on 45 kg of base particles may be used. The weight percentage of the mass of the reacted layer 24 per the mass of the base particles 12. In an embodiment, the weight percentage may be at least approximately 2 wt %, at least approximately 4 wt %, at least approximately 7 wt %, at least approximately 12 wt %, or at least approximately 15 wt %, and in another embodiment no greater than approximately 40 wt %, no greater than approximately 34 wt %, no greater than approximately 27 wt %, no greater than approximately 21 wt %, or no greater than approximately 17 wt %.

The averaged particle size of a material within the reacted layer 24 may be changed as compared to the corresponding unreacted material from the unreacted layer 14. In an embodiment, the material within the reacted layer 24 has a D10 averaged particle size that is at least approximately 0.001 microns, at least approximately 0.015 microns, at least approximately 0.11 microns, or at least approximately 1 micron, and in another embodiment, the D10 averaged particle size no greater than approximately 30 microns, no greater than approximately 8 microns, no greater than approximately 0.2 microns, or no greater than approximately 0.01 microns. In an embodiment, the material within the reacted layer 24 has a D50 averaged particle size that is at least approximately 0.1 microns, at least approximately 0.8 microns, at least approximately 1.3 microns, or at least approximately 2 microns, and in another embodiment, the D50 averaged particle size no greater than approximately 90 microns, no greater than approximately 21 microns, no greater than approximately 7 microns, or no greater than approximately 0.7 microns. In an embodiment, the material within the reacted layer 24 has a D90 averaged particle size that is at least approximately 0.7 microns, at least approximately 1 micron, at least approximately 7 microns, or at least approximately 20 microns, and in another embodiment, the D90 averaged particle size no greater than approximately 220 microns, no greater than approximately 110 microns, no greater than approximately 30 microns, or no greater than approximately 17 microns.

A volume occupied by the roofing granule before the reaction (that is, the volume occupied by a combination of the base particle 12 and the unreacted layer 14 for the embodiment illustrated in FIG. 1), also referred to as the pre-reaction volume, is substantially the same as the volume occupied by the roofing granule 20 after the reaction (that is, the volume occupied by a combination of the base particle 12 and the reacted layer 24 for the embodiment illustrated in FIG. 2), also referred to as the post-reaction volume. In actual practice, the volume may change such that the post-reaction volume is greater than or less than the pre-reaction volume. In an embodiment, the post-reaction volume of the roofing granule 20 is within approximately 30%, within approximately 20%, within approximately 15%, within approximately 9%, within approximately 5%, or within approximately 2% of the pre-reaction volume of the roofing granule.

Similar to the roofing granule, a volume occupied by the unreacted layer 14 is substantially the same as the volume occupied by the volume occupied by the reacted layer 24. In actual practice, the volume may change such that the volume of the reacted layer 24 is greater than or less than the volume of the unreacted layer 14. In an embodiment, the volume of the reacted layer 24 is within approximately 30%, within approximately 20%, within approximately 15%, within approximately 9%, within approximately 5%, or within approximately 2% of the volume of the unreacted layer 14.

Figure 3:
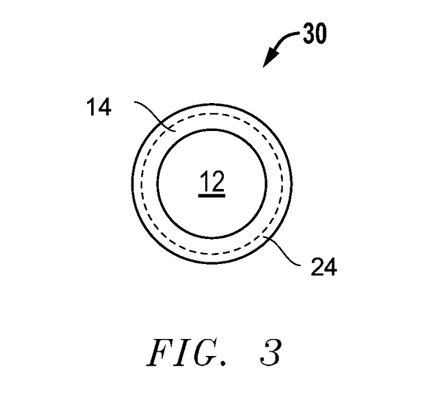
FIG. 3 includes an illustration of a cross-sectional view of a roofing granule in accordance with a further embodiment.

In another embodiment, not all of the material within the layer 14 may react. As illustrated in FIG. 3, a roofing granule 30 includes the base particle 12, an unreacted portion of the layer 14, and the reacted layer 24. At least 0.0001% of the layer 14 may be reacted. In this particular embodiment, the thickness of the reacted layer 24 may provide sufficient protection to the roofing granule 30 for conditions under which the roofing granule 30 will normally be exposed. The unreacted layer 14 can have a density less as compared to the reacted layer 24, and therefore, the mass of the roofing granule 30 can be reduced by not reacting all of the layer 14. The roofing granule 30 may be used in an application where it is not located along a surface that is supposed to support a load, such as wall or ceiling panels, wall cladding or a framing member adjacent to a window or door. In an embodiment, no more than approximately 50%, no more than approximately 40%, no more than approximately 30%, no more than approximately 20%, or no more than approximately 9% of the layer 14 is reacted.

In another application, more of the layer 14 may need to be reacted. In an embodiment, at least approximately 50%, at least approximately 70%, at least approximately 80%, at least approximately 90%, or at least approximately 95% of the layer 14 is reacted. In a particular embodiment, at least approximately 99% or substantially all of the layer 14 is reacted.

Figure 4:
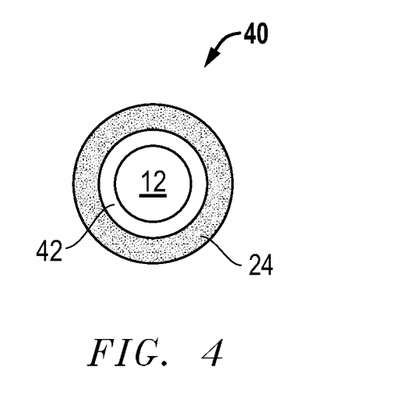
FIG. 4 includes an illustration of a cross-sectional view of a roofing granule in accordance with yet a further embodiment.

In a further embodiment, the infiltrant can reach the base particle 12 and react with a portion of the base particle 12 to form an intermediate layer 42 between the reacted layer 24 and the base particle 12, as illustrated in FIG. 4. In a particular embodiment, the base particle 12 can include any of the base particles or roofing granules as described in U.S. Patent Application No. 61/701,080 entitled "Roofing Granule Including a Base Particle and a Layer Covering the Base Particle, a Process of Forming the Same, and a Roofing Product Including the Roofing Granule" by Jacobs et al. filed on Sep. 12, 2012 and to U.S. applications claiming benefits therefrom filed on even date, which are assigned to the current assignee hereof and incorporated herein by reference in their entireties. The intermediate layer 42 may extend partly, but not completely, through the base particle 12. In an embodiment, the intermediate layer can extend to an interface penetration distance from an interface with the reacted layer 24. In an embodiment, the interface penetration distance extends at least approximately 10%, at least approximately 20%, at least approximately 30%, at least approximately 40%, at least approximately 50%, at least approximately 60%, at least approximately 70%, at least approximately 80%, or at least approximately 90% of the distance from the interface to an outer surface of the base particle 12, when compared to the originally formed base particle 12 (before the reaction). In an embodiment, the interface penetration distance extends at least approximately 0.011 mm, at least approximately 0.05 mm, at least approximately 0.11 mm, at least approximately 0.5 mm, or at least approximately 1.1 mm of the distance from the interface with the reacted layer 24, and in another embodiment, the interface penetration distance extends no greater than approximately 2 mm, no greater than approximately 1.4 mm, no greater than approximately 0.9 mm, or no greater than approximately 0.5 mm of the distance from the interface with the reacted layer 24.

An open porosity of the intermediate layer 42 may be no greater than approximately 99%, no greater than approximately 97%, no greater than approximately 95%, no greater than approximately 90%, or no greater than approximately 80% of an open porosity of the base particle 12. In an embodiment, the intermediate layer 42 has an open porosity of at least approximately 4%, at least approximately 8%, at least approximately 11%, or at least approximately 15%, and in another embodiment, has an open porosity no greater than approximately 28%, no greater than approximately 21%, no greater than approximately 17%, or no greater than approximately 13%. In a further embodiment, the intermediate layer 42 has an open porosity of at least approximately 4%, at least approximately 7%, at least approximately 10%, or at least approximately 14%, and in another embodiment, has an open porosity no greater than approximately 28%, no greater than approximately 20%, no greater than approximately 16%, or no greater than approximately 12%.

In an embodiment, the base particle 12 has a pre-reaction open porosity before reacting, and the base particle 12 has a post-reaction open porosity after reacting. The post-reaction open porosity is no greater than approximately 99%, no greater than approximately 97%, no greater than approximately 95%, no greater than approximately 90%, or no greater than approximately 80% of the pre-reaction open porosity. In a particular embodiment, before reacting, the base particle 12 has an open porosity of at least approximately 5%, at least approximately 12%, at least approximately 17%, or at least approximately 25%, and the base particle 12 may have an open porosity no greater than approximately 30%, no greater than approximately 23%, no greater than approximately 19%, or no greater than approximately 15%. In another particular embodiment, after reacting, the base particle 12 has an open porosity of at least approximately 2%, at least approximately 9%, at least approximately 14%, or at least approximately 18%, and the base particle 12 may have an open porosity no greater than approximately 29%, no greater than approximately 22%, no greater than approximately 18%, or no greater than approximately 15%.

A volume occupied by the base particle 12 before the reaction can be substantially the same as the volume occupied by a combination of the unreacted portion of base particle 12 and the intermediate layer 42. In actual practice, the volume may change such that the volume after the reaction is greater than or less than the volume before the reaction. In an embodiment, the volume of the combination of the unreacted portion of the base particle 12 and the intermediate layer 42 is within approximately 30%, within approximately 20%, within approximately 15%, within approximately 9%, within approximately 5%, or within approximately 2% of the volume of the base particle 12 before the reaction.

The intermediate layer 42 can include a particular metal carbonate, wherein the particular metal of the metal carbonate originates from the base particle 12. In another embodiment, the intermediate layer 42 can include a compound with a metal element from the layer 14 and a different metal element from the base particle 12.

The base particle 12 or the layer 14 may include an antimicrobial agent as originally formed, or the reaction with the layer 14, the base particle 12, or both can produce an antimicrobial agent. In a particular embodiment, the antimicrobial agent comprises a photocatalytic antimicrobial agent adjacent to a surface of the base particle 12. In another particular embodiment, the antimicrobial agent comprises a photocatalytic antimicrobial agent at or near a surface of the layer 14. In a further embodiment, the reaction produces $Cu_2O$, $Ag_2O$, $SnO_2$, $ZnO$, $TiO_2$, or any combination thereof.

Figure 5:
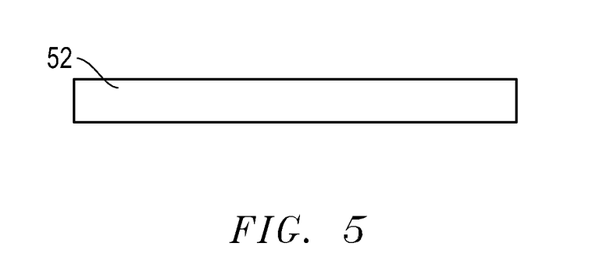
FIG. 5 includes an illustration of a substrate used for a roofing product.
Figure 6:
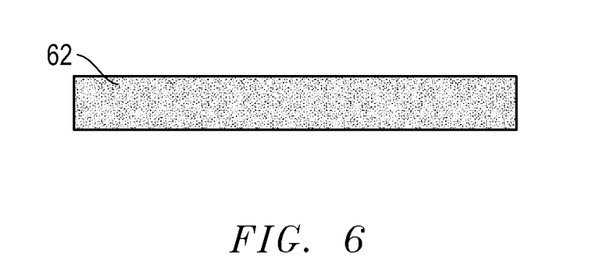
FIG. 6 includes an illustration of the substrate of FIG. 5 after the substrate has been coated with a bituminous material.
Figure 7:
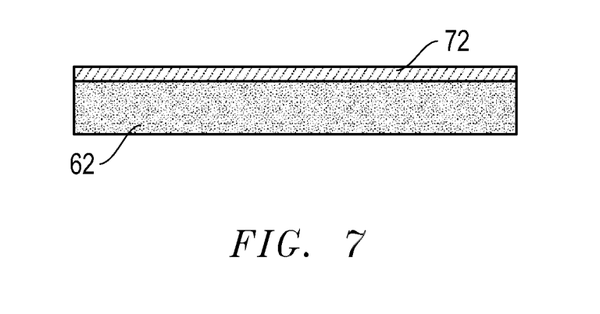
FIG. 7 includes an illustration of the substrate of FIG. 6 after applying roofing granules along an exposed surface of the substrate.

A roofing product can be formed using any of the previously described roofing granules made by any of the previously described processes. FIG. 5 includes an illustration of a cross-sectional view of a substrate 52 for the roofing product. The roofing product can include a shingle, a membrane, or the like. The substrate 52 can include a fiberglass mat, wood, cellulose, polyester, or another suitable substrate used for a roofing product. The substrate 52 is coated with a bituminous material to form the coated substrate 62, as illustrated in FIG. 6. The bituminous material can include asphalt, coal tar, a recycled roofing material, a synthetic bituminous material, or any combination thereof. If needed or desired, an additional coating of any of the foregoing bituminous materials may be applied to the coated substrate 62. Referring to FIG. 7, roofing granules 72 are applied to the coated substrate 62. The roofing granules 72 can be any of the previously described roofing granules, and are applied to the coated substrate 62 using a conventional technique. If another coating of bituminous material was applied the coated substrate 62, the roofing granules 72 are applied after the last layer of bituminous material is coated onto the coated substrate 62. Further processing may be performed if needed or desired. For example, a parting agent or release sheet (not illustrated) may be applied to the side of the roofing product opposite the roofing granules 72. In another embodiment, another sheet of roofing material may be laminated to the roofing product previously described to form a laminated roofing product. In another embodiment, a metallic sheet can be used as a substrate for a roofing product. An adhesive film or coating may be applied to the metallic sheet, and the roofing granules 72 can be applied to the adhesive film or coating. After reading the specification, skilled artisans will be able to form roofing products for their specific applications.

The formation of roofing granules as described herein can help reduce atmospheric $CO_2$ or another greenhouse gas by capturing such gas to form carbonic acid or a carbonate compound. The carbonic acid or carbonate compound can react with a metal to form a stable metal carbonate that is not readily converted back to $CO_2$ in normal use of the building process. Thus, the process can be used to reduce $CO_2$ in the atmosphere and still form a useful the roofing granule. The application of the roofing granules onto roofing products may not change or may be only slightly modified.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A roofing granule comprising:
a base particle having a base material; and
a first layer covering the base particle of the roofing granule, wherein:
the first layer has a first material and a second material that includes a metal carbonate;
the first and second materials include a same metal element; and
the base material is different from the first material.

Item 2. The roofing granule of Item 1, wherein the first layer further comprises an organic colorant or an inorganic colorant.

Item 3. The roofing granule of Item 2, wherein the organic colorant comprises an organic pigment or an organic dye.

Item 4. The roofing granule of Item 2, wherein the organic colorant is selected from the group consisting of phthalocyanine pigments, quinacridone pigments, azo pigments and perylene pigments, their dye analogs, and any combination thereof.

Item 5. The roofing granule of Item 3, wherein the organic pigment is selected from the group consisting of quinacridone pigments; phthalocyanine pigments; azo pigments such as mono azo pigments, and including azo lakes, azo chelates, and condensed azo pigments; beta-naphthol pigments; anthraquinone pigments including anthrapyrimidine pigments, flavanthrone pigments, pyranthrone pigments, and anthanthrone pigments, dioxazine pigments; quinophathalone pigments, diketopyrrolopyrrole pigments, thioindigo pigments, perylene pigments, perinone pigments, indanthrone pigments, isoindoline pigments, isoindolinone pigments, quinophathalone pigments, quinacridone pigments, quinacridone quinone pigments, thiazineindigo pigments; and any combination thereof.

Item 6. The roofing granule of Item 1, wherein the base particle has a smaller amount of open porosity as compared to the first layer.

Item 7. The roofing granule of Item 1, wherein the base particle has a base open porosity, the first layer has a first open porosity, and the base open porosity is no greater than approximately 95%, no greater than approximately 90%, no greater than approximately 80%, no greater than approximately 70%, no greater than approximately 50%, or no greater than approximately 20% of the first open porosity.

Item 8. The roofing granule of Item 1, wherein the first layer has an open porosity of at least approximately 5%, at least approximately 12%, at least approximately 17%, or at least approximately 25%.

Item 9. The roofing granule of Item 1, wherein the first layer has an open porosity no greater than approximately 30%, no greater than approximately 23%, no greater than approximately 19%, or no greater than approximately 15%.

Item 10. The roofing granule of Item 1, wherein the base particle has an open porosity of at least approximately 3%, at least approximately 7%, at least approximately 10%, or at least approximately 12%.

Item 11. The roofing granule of Item 1, wherein the base particle has an open porosity of no greater than approximately 15%, no greater than approximately 12%, no greater than approximately 10%, or no greater than approximately 8%.

Item 12. The roofing granule of Item 1, wherein the first layer has a pore size that is at least about 0.01 microns, at least about 0.1 microns, or at least about 0.5 microns; or no greater than about 100 microns, no greater than about 20 microns, or no greater than about 1 micron.

Item 13. The roofing granule of Item 1, wherein the base particle occupies a base volume, the first layer occupies a first volume, and a ratio of the base volume to the first volume is at least approximately 1.1:1, at least approximately 1.5:1, at least approximately 2:1, at least approximately 3:1, at least approximately 5:1, at least approximately 9:1, at least approximately 14:1, or at least approximately 20:1.

Item 14. The roofing granule of Item 1, wherein a weight percentage of a mass of the first layer per a mass of the base particle is at least approximately 2 wt %, at least approximately 4 wt %, at least approximately 7 wt %, at least approximately 12 wt %, or at least approximately 15 wt %; or no greater than approximately 40 wt %, no greater than approximately 34 wt %, no greater than approximately 27 wt %, no greater than approximately 21 wt %, or no greater than approximately 17 wt %.

Item 15. The roofing granule of Item 1, wherein the base material has a different composition as compared to the first material.

Item 16. The roofing granule of Item 1, wherein the base material is capable of reacting with the same metal element under conditions at which the first material can react with the same metal to form the second material.

Item 17. The roofing granule of Item 1, wherein the first layer further comprises an antimicrobial agent, wherein the first material and the antimicrobial agent include a same metal element.

Item 18. The roofing granule of Item 17, wherein the antimicrobial agent comprises a photocatalytic antimicrobial agent adjacent to a surface of the base particle.

Item 19 The roofing granule of Item 17, wherein the antimicrobial agent comprises a photocatalytic antimicrobial agent adjacent to a surface of the first layer.

Item 20. The roofing granule of Item 17, wherein the antimicrobial agent comprises $Cu_2O$, $Ag_2O$, $SnO_2$, $ZnO$, $TiO_2$, or any combination thereof.

Item 21. The roofing granule of Item 1, further comprising an interphase compound between the base particle and the first layer, wherein the interphase compound includes a base constituent from the base material and a first constituent from the first material.

Item 22. The roofing granule of Item 1, wherein the base particle further comprises a particular metal carbonate, wherein the base material and the particular metal carbonate comprise a same metal element.

Item 23. The roofing granule of Item 22, wherein the particular metal carbonate extends to an interface penetration distance from an interface with the base particle.

Item 24. The roofing granule of Item 23, wherein the interface penetration distance extends partly, but not completely through the base particle.

Item 25. The roofing granule of Item 23, wherein the interface penetration distance extends at least approximately 10%, at least approximately 20%, at least approximately 30%, at least approximately 40%, at least approximately 50%, at least approximately 60%, at least approximately 70%, at least approximately 80%, or at least approximately 90% of the distance from the interface to an outer surface of the base particle.

Item 26. The roofing granule of Item 23, wherein the interface penetration distance extends at least approximately 0.011 mm, at least approximately 0.05 mm, at least approximately 0.11 mm, at least approximately 0.5 mm, or at least approximately 1.1 mm of the distance from the interface.

Item 27. The roofing granule of Item 23, wherein the interface penetration distance extends no greater than approximately 2 mm, no greater than approximately 1.4 mm, no greater than approximately 0.9 mm, or no greater than approximately 0.5 mm of the distance from the interface.

Item 28. The roofing granule of Item 1, wherein the first material comprises a metal oxide, a metal silicate, a metal hydroxide, or an aluminosilicate.

Item 29. The roofing granule of Item 1, wherein the first material comprises a mixed-metal compound.

Item 30. The roofing granule of Item 1, wherein the first material includes a low density filler material or a void containing filler material.

Item 31. The roofing granule of Item 1, wherein a solubility of the metal carbonate in water at 20° C. is less than about 0.05, less than about 0.004, less than about 0.001, or less than about 0.0008 grams per 100 grams of water.

Item 32. The roofing granule of Item 1, wherein the base particles comprises talc, slag, granite, silica sand, greenstone, andesite, porphyry, marble, syenite, rhyolite, diabase, greystone, quartz, slate, trap rock, basalt, sintered ceramic, crushed brick, crushed concrete, crushed porcelain, crushed fire clay, crushed marine shell, crushed ceramic, or any combination thereof.

Item 33. A roofing product comprising roofing granules including the roofing granule of Item 1.

Item 34. The roofing product of Item 33, wherein the roofing product comprises a roofing shingle.

Item 35. A process of forming a roofing granule comprising:
forming a first layer over a base particle, wherein the base particle has a base material, the first layer has a first material different from the base material, and the first layer has pores;
infiltrating a fluid into the pores of the first layer while the base particle is present and adjacent to the first layer, wherein the fluid includes a carbonate; and
reacting the carbonate with a metal compound within the first layer to form a metal carbonate within the first layer of the roofing granule.

Item 36. The process of Item 35, wherein forming the first layer comprises forming the first layer further comprising an organic colorant or an inorganic colorant.

Item 37. The process of Item 36, wherein the organic colorant comprises an organic pigment or an organic dye.

Item 38. The process of Item 35, further comprising introducing an organic colorant into the first layer before reacting the carbonate with the metal compound.

Item 39. The process of Item 35, wherein infiltrating a fluid comprises infiltrating a fluid including an organic colorant.

Item 40. The process of Item 39, wherein the organic colorant is selected from the group consisting of phthalocyanine pigments, quinacridone pigments, azo pigments and perylene pigments, their dye analogs, and any combination thereof.

Item 41. The process of Item 39, wherein the organic colorant comprises an organic pigment is selected from the group consisting of quinacridone pigments; phthalocyanine pigments; azo pigments such as mono azo pigments, and including azo lakes, azo chelates, and condensed azo pigments; beta-naphthol pigments; anthraquinone pigments including anthrapyrimidine pigments, flavanthrone pigments, pyranthrone pigments, and anthanthrone pigments, dioxazine pigments; quinophathalone pigments, diketopyrrolopyrrole pigments, thioindigo pigments, perylene pigments, perinone pigments, indanthrone pigments, isoindoline pigments, isoindolinone pigments, quinophathalone pigments, quinacridone pigments, quinacridone quinone pigments, thiazineindigo pigments; and any combination thereof.

Item 42. The process of Item 35, wherein forming the first layer comprises coating the base particle using a fluidized bed process.

Item 43. The process of Item 35, wherein forming the first layer comprises coating the base particle using a precipitation process.

Item 44. The process of Item 35, wherein before reacting, the base particle has a base open porosity, the first layer has a first open porosity, and the base open porosity is no greater than approximately 95%, no greater than approximately 90%, no greater than approximately 80%, no greater than approximately 70%, no greater than approximately 50%, or no greater than approximately 20% of the first open porosity.

Item 45. The process of Item 35, wherein after reacting, the base particle has a base open porosity, the first layer has a first open porosity, and the base open porosity is at least approximately 11%, at least approximately 20%, at least approximately 30%, at least approximately 50%, or at least approximately 70% of the first open porosity.

Item 46. The process of Item 35, wherein the first layer has a pre-reaction open porosity before reacting, the first layer has a post-reaction open porosity after reacting, and the post-reaction open porosity is no greater than approximately 99%, no greater than approximately 95%, no greater than approximately 90%, no greater than approximately 80%, or no greater than approximately 70% of the pre-reaction open porosity.

Item 47. The process of Item 35, wherein before reacting, the first layer has an open porosity of at least approximately 5%, at least approximately 12%, at least approximately 17%, or at least approximately 25%.

Item 48. The process of Item 35, wherein before reacting, the first layer has an open porosity no greater than approximately 30%, no greater than approximately 23%, no greater than approximately 19%, or no greater than approximately 15%.

Item 49. The process of Item 35, wherein after reacting, the first layer has an open porosity of at least approximately 2%, at least approximately 9%, at least approximately 14%, or at least approximately 18%.

Item 50. The process of Item 35, wherein after reacting, the first layer has an open porosity no greater than approximately 29%, no greater than approximately 22%, no greater than approximately 18%, or no greater than approximately 15%.

Item 51. The process of Item 35, wherein before reacting, the first material has a pore size that is at least about 0.01 microns, at least approximately 0.1 microns, or at least approximately 0.5 microns; or no greater than approximately 100 microns, no greater than approximately 20 microns, or no greater than approximately 1 micron.

Item 52. The process of Item 35, wherein a solubility of the metal carbonate in water at 20° C. is less than about 0.05, less than about 0.004, less than about 0.001, or less than about 0.0008 grams per 100 grams of water.

Item 53. The process of Item 35, wherein the base material has a different composition as compared to the first material.

Item 54. The process of Item 35, wherein the base particle occupies a base volume, the first layer occupies a first volume, and a ratio of the base volume to the first volume is at least approximately 1.1:1, at least approximately 1.5:1, at least approximately 2:1, at least approximately 3:1, at least approximately 5:1, at least approximately 9:1, at least approximately 14:1, or at least approximately 20:1.

Item 55. The process of Item 35, wherein a weight percentage of a mass of the first layer per a mass of the base particle is at least approximately 2 wt %, at least approximately 4 wt %, at least approximately 7 wt %, at least approximately 12 wt %, or at least approximately 15 wt %; or no greater than approximately 40 wt %, no greater than approximately 34 wt %, no greater than approximately 27 wt %, no greater than approximately 21 wt %, or no greater than approximately 17 wt %.

Item 56. The process of Item 35, wherein before reacting, the roofing granule occupies a pre-reaction volume, after reacting, the roofing granule occupies a post reaction volume, and the post-reaction volume is within approximately 30%, within approximately 20%, within approximately 15%, within approximately 9%, within approximately 5%, or within approximately 2% of the pre-reaction volume.

Item 57. The process of Item 35, wherein before reacting, the first layer occupies a pre-reaction volume, after reacting, the first layer occupies a post reaction volume, and the post-reaction volume is within approximately 30%, approximately 20%, within approximately 15%, within approximately 9%, within approximately 5%, or within approximately 2% of the pre-reaction volume.

Item 58. The process of Item 35, wherein the fluid comprises a liquid.

Item 59. The process of Item 58, wherein liquid comprises water.

Item 60. The process of Item 58, wherein liquid has substantially no water.

Item 61. The process of Item 58, wherein liquid comprises ammonia or an organic compound.

Item 62. The process of Item 58, wherein the liquid comprises a dye.

Item 63. The process of Item 58, wherein the liquid has a pH greater than 7, 8, 9, 10, 11, or 12.

Item 64. The process of Item 58, wherein the liquid has a pH less than 7, 6, 5, or 4.

Item 65. The process of Item 58, wherein reacting is performed at a pressure higher than atmospheric pressure.

Item 66. The process of Item 58, wherein reacting is performed at a pressure of at least approximately 5 kPa, at least approximately 11 kPa, at least approximately 50 kPa, at least approximately 110 kPa, at least approximately 500 kPa, at least approximately 1.1 MPa, at least approximately 5 MPa, at least approximately 11 MPa, or at least approximately 50 MPa.

Item 67. The process of Item 58, wherein reacting is performed at a pressure no greater than approximately 900 MPa, no greater than approximately 500 MPa, no greater than least approximately 90 MPa, or no greater than approximately 50 MPa, no greater than approximately 900 kPa, no greater than approximately 500 kPa, no greater than approximately 90 kPa, or no greater than approximately 50 kPa.

Item 68. The process of Item 58, wherein reacting is performed at a temperature of at least approximately 20° C., at least approximately 50° C., at least approximately 80° C., at least approximately 110° C., at least approximately 150° C., at least approximately 200° C., at least approximately 250° C., or at least approximately 300° C.

Item 69. The process of Item 58, wherein reacting is performed at a temperature no greater than approximately 500° C., no greater than approximately 300° C., no greater than approximately 250° C., no greater than approximately 190° C., no greater than approximately 150° C., no greater than approximately 130° C., no greater than approximately 100° C., or no greater than approximately 90° C.

Item 70. The process of Item 58, wherein reacting is performed for a time period of at least approximately 11 seconds, at least approximately 1.1 minutes, at least approximately 5 minutes, at least approximately 11 minutes, at least approximately 20 minutes, at least approximately 1 hour, at least approximately 11 hours, at least approximately 20 hours, at least approximately 50 hours.

Item 71. The process of Item 58, wherein reacting is performed for a time period no greater than approximately 200 hours, no greater than approximately 90 hours, no greater than approximately 24 hours, no greater than approximately 5 hours, no greater than approximately 3 hours, no greater than approximately 2 hours, no greater than approximately 0.9 hour, or no greater than approximately 0.5 hour.

Item 72. The process of Item 35, wherein reacting further produces an antimicrobial agent.

Item 73. The process of Item 72, wherein the antimicrobial agent comprises a photocatalytic antimicrobial agent adjacent to a surface of the base particle.

Item 74. The process of Item 35, wherein reacting further produces $Cu_2O$, $Ag_2O$, $SnO_2$, $ZnO$, $TiO_2$, or any combination thereof.

Item 75. The process of Item 35, wherein reacting is performed such that an interphase compound is formed that includes a base constituent from the base material and a first constituent from the first material.

Item 76. The process of Item 35, wherein:
infiltrating the fluid comprises infiltrating the fluid such that the fluid reaches the base particle; and
reacting the carbonate comprises reacting the carbonate with a particular metal compound within the base particle to form a particular metal carbonate.

Item 77. The process of Item 76, wherein the particular metal carbonate extends to an interface penetration distance from an interface with the base particle.

Item 78. The process of Item 77, wherein the interface penetration distance extends partly, but not completely through the base particle.

Item 79. The process of Item 77, wherein the interface penetration distance extends at least approximately 10%, at least approximately 20%, at least approximately 30%, at least approximately 40%, at least approximately 50%, at least approximately 60%, at least approximately 70%, at least approximately 80%, or at least approximately 90% of the distance from the interface to an outer surface of the base particle.

Item 80. The process of Item 77, wherein the interface penetration distance extends at least approximately 0.011 mm, at least approximately 0.05 mm, at least approximately 0.11 mm, at least approximately 0.5 mm, or at least approximately 1.1 mm of the distance from the interface.

Item 81. The process of Item 77, wherein the interface penetration distance extends no greater than approximately 2 mm, no greater than approximately 1.4 mm, no greater than approximately 0.9 mm, or no greater than approximately 0.5 mm of the distance from the interface.

Item 82. The process of Item 76, wherein the base particle has a pre-reaction open porosity before reacting, the base particle has a post-reaction open porosity after reacting, and the post-reaction open porosity is no greater than approximately 99%, no greater than approximately 97%, no greater than approximately 95%, no greater than approximately 90%, or no greater than approximately 80% of the pre-reaction open porosity.

Item 83. The process of Item 76, wherein before reacting, the base particle has an open porosity of at least approximately 5%, at least approximately 12%, at least approximately 17%, or at least approximately 25%.

Item 84. The process of Item 76, wherein before reacting, the base particle has an open porosity no greater than approximately 30%, no greater than approximately 23%, no greater than approximately 19%, or no greater than approximately 15%.

Item 85. The process of Item 76, wherein after reacting, the base particle has an open porosity of at least approximately 2%, at least approximately 9%, at least approximately 14%, or at least approximately 18%.

Item 86. The process of Item 76, wherein after reacting, the base particle has an open porosity no greater than approximately 29%, no greater than approximately 22%, no greater than approximately 18%, or no greater than approximately 15%.

Item 87. The process of Item 35, wherein before reacting, the base particle occupies a pre-reaction volume, after reacting, the base particle occupies a post reaction volume, and the post-reaction volume is within approximately 30%, approximately 20%, no greater than approximately 15%, no greater than approximately 9%, no greater than approximately 5%, or no greater than approximately 2% of the pre-reaction volume.

Item 88. The process of Item 35, wherein the first material comprises a metal oxide, a metal silicate, a metal hydroxide, or an aluminosilicate.

Item 89. The process of Item 35, wherein the first material comprises a mixed-metal compound.

Item 90. The process of Item 35, wherein the first material, the second material, or the first and second materials include a low density filler material or a void containing filler material.

Item 91. The process of Item 35, wherein the base particles comprises talc, slag, granite, silica sand, greenstone, andesite, porphyry, marble, syenite, rhyolite, diabase, greystone, quartz, slate, trap rock, basalt, sintered ceramic, crushed brick, crushed concrete, crushed porcelain, crushed fire clay, crushed marine shell, crushed ceramic, or any combination thereof.

Item 92. A process of forming a roofing product comprising placing roofing granules over an bitumen-coated substrate, wherein the roofing granules include the roofing granule formed by the process of Item 35.

Item 93. The process of Item 92, wherein the process of forming the roofing product comprises a process of forming a roofing shingle.

Item 94. The process of Item 35, wherein the base material is substantially non-porous.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:
1. A roofing granule comprising:
a base particle having an unreacted base material, the base particle having an average diameter of up to approximately 2.4 mm; and
a first layer covering the base particle of the roofing granule, wherein:

the first layer has a first material and a second material that includes a metal carbonate;

the first and second materials include a same metal element; and the unreacted base material is different from the first material, wherein the base particle has an open porosity not greater than 50% of an open porosity of the first layer, wherein the first and the second materials have a D90 particle size of at least 0.7 microns and the base material has an average particle size not greater than 90% of the average particle size of the first and second materials.

2. The roofing granule of claim 1, wherein the first layer further comprises an organic colorant or an inorganic colorant.

3. The roofing granule of claim 1, wherein the base particle occupies a base volume, the first layer occupies a first volume, and a ratio of the base volume to the first volume is at least approximately 1.1:1, at least approximately 1.5:1, at least approximately 2:1, at least approximately 3:1, at least approximately 5:1, at least approximately 9:1, at least approximately 14:1, or at least approximately 20:1.

4. The roofing granule of claim 1, wherein the first layer further comprises an antimicrobial agent, wherein the first material and the antimicrobial agent include a same metal element.

5. The roofing granule of claim 1, further comprising an interphase compound between the base particle and the first layer, wherein the interphase compound includes a base constituent from the base material and a first constituent from the first material.

6. The roofing granule of claim 1, wherein the base particle further comprises a particular metal carbonate, wherein the base material and the particular metal carbonate comprise a same metal element.

7. The roofing granule of claim 1, wherein a solubility of the metal carbonate in water at 20° C. is less than about 0.05, less than about 0.004, less than about 0.001, or less than about 0.0008 grams per 100 grams of water.

8. A roofing product comprising roofing granules including the roofing granule of claim 1.

9. The roofing product of claim 8, wherein the roofing product comprises a roofing shingle.

* * * * *

UNITED STATES PATENT AND TRADEMARK OFFICE
CERTIFICATE OF CORRECTION

PATENT NO. : 9,670,677 B2  
APPLICATION NO. : 14/023151  
DATED : June 6, 2017  
INVENTOR(S) : Ming-Liang Shiao et al.

Page 1 of 1

It is certified that error appears in the above-identified patent and that said Letters Patent is hereby corrected as shown below:

On the Title Page

Right column, "(56) References Cited", "OTHER PUBLICATIONS", Line 2, "Liang Shoo et al." should read --Liang Shiao et al.--; and "(57) ABSTRACT", Line 3, "layer can has a" should read --layer has a--.

Signed and Sealed this
Thirtieth Day of April, 2019

Andrei Iancu
*Director of the United States Patent and Trademark Office*